April 13, 1954
W. GRUND
2,674,872
EXPANSION JOINT
Original Filed Feb. 23, 1950
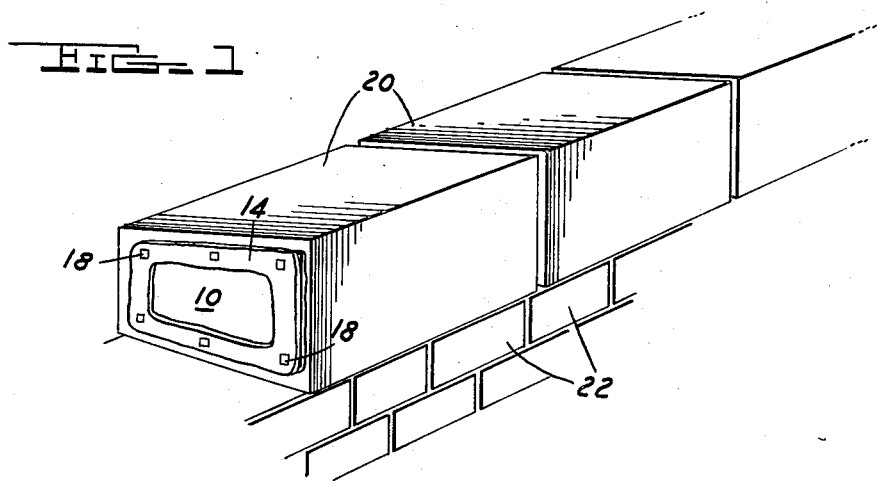
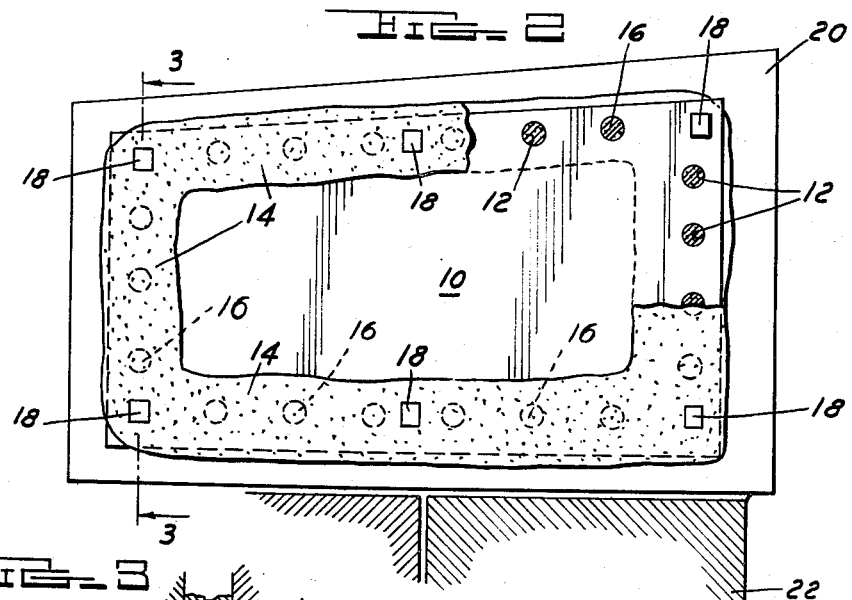
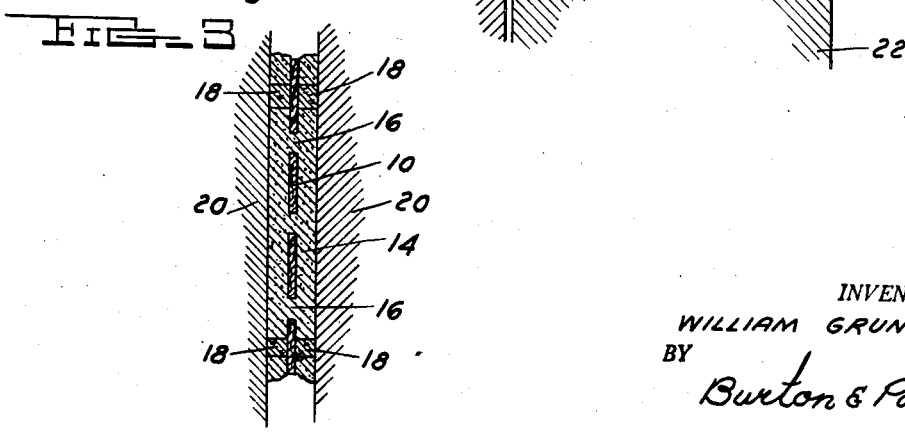
INVENTOR.
WILLIAM GRUND
BY
*Burton & Parker*
ATTORNEYS

UNITED STATES PATENT OFFICE 2,674,872

EXPANSION JOINT

William Grund, Detroit, Mich.

Continuation of abandoned application Serial No. 145,751, February 23, 1950. This application July 15, 1953, Serial No. 368,087

4 Claims. (Cl. 72—106)

This invention relates to expansion joints for use between structural units and particularly to expansion joints adapted to be positioned between perforated structural units or blocks. This invention constitutes an improvement in the type of expansion joints illustrated in my prior United States Patents Nos. 1,990,323; 2,290,424 and 2,331,389. This application is a continuation of my application Serial No. 145,751 filed February 23, 1950, now abandoned.

It has been the general practice heretofore in the construction industry to provide clearances at spaced intervals between structural units in order to allow for the natural expansion and contraction of the units due to variations in the temperature. Such spaces have been filled with expansion joint material. My patents above listed illustrate expansion gasket joints which have heretofore been widely used. One difficulty which has arisen in the use of expansion units of this character was the time required by the workman to gauge the width of the expansion joint space between the structural units. Frequently, workmen merely placed the structural blocks one after the other with little regard to the desired amount of width for the expansion joint, and in many cases the blocks were placed too close together or left too far apart thereby impairing the effectiveness of the joint.

It is an important object of the present invention to provide an expansion joint which is so constructed as to facilitate the proper spacing of the structural units and to limit the initial compression of the adhesive gasket material while ensuring the presence of sufficient material to form a proper joint between the structural blocks.

A feature of this invention is that the expansion joint is provided on opposite sides of a base sheet with compressible adhesive gasket material, and embedded within the gasket material on opposite sides of the base sheet are spacer elements which are yieldable under substantial compression but which are relatively rigid as compared with the adhesive gasket material itself and therefore serve to initially space the structural units disposed on opposite sides of the joint apart.

These spacer elements have a normal thickness sufficient to establish the desired spacing apart of the structural units with which the expansion gasket joint is to be used. They may be formed of material such as cork which is yieldable under substantial compression by the structural units between which the joint is spaced. The elements therefore serve with the base sheet to initially space the structural units apart.

Another important advantage of the expansion joint of this application is that it is capable of manufacture and assembly at low cost and is readily and easily installed by the workmen and itself furnishes a guide and standard for the spacing of the structural blocks with which it is used. Furthermore, it is capable of use with all types of structural units such as stone copings, cornices, sills, etc. and forms a long-lasting seal between the units.

In carrying out the invention, the expansion joint comprises, in general, a base support sheet or panel of relatively rigid material on the opposite sides of which are disposed bodies of compressible adhesive gasket material which engage opposed surfaces of the structural units between which the panel is placed and form a seal to prevent the entrance of moisture. The expansion joint is provided with spacer elements located on the opposite sides of the panel embedded within the gasket material and which are composed of material which is compressible but as compared with the gasket material is relatively rigid and which cooperate with the panel to hold the structural units at the desired spacing at the time they are laid. These spacer elements are preferably mounted on the panel by embedding the same in the gasket material and utilizing the adhesive characteristics of the gasket material to hold the spacer elements on the panel and in bearing engagement therewith.

In a preferred form of the invention, the panel is provided with a row of holes along each edge thereof over which the gasket material lies and through which the gasket material extends to interlock the material on one side of the panel with that on the other. The spacer elements, when embedded in the gasket material, are so located as to be offset to these apertures or holes in order to convey any pressure thereon directly to the panel.

In this preferred form of construction the spacer elements possess normally substantially the thickness of the adhesive gasket material within which they are embedded and by which they are held to the base panel though obviously they might have a thickness sufficient to serve satisfactorily as spacers but differing from the normal adhesive gasket material thickness. Such spacer elements are also preferably normally held by the adhesive gasket material in bearing but disconnected engagement with the base panel.

While such spacer elements possess substantially greater resistance to compression than does the adhesive gasket material within which the spacers are embedded, when the expansion gasket joint is disposed between a pair of building blocks such spacer elements can yield under pressure of the blocks thereagainst so that the adhesive gasket material is urged to form a tight secure complete weatherproof joint and seal between the blocks.

These spacer elements are supported upon opposite sides of the base panel in spaced apart relation through being held by or suspended within the adhesive gasket material itself within which they are ambedded and so held that they can be brought into engagement with while disconnected from the base panel. Such spacers may shift within the adhesive gasket material to accommodate themselves better to engagement with the building blocks and such shifting is due to the disconnected engagement of the spacers with the rigid base panel itself.

Various other objects, advantages and meritorious features of the invention will become more fully apparent from the following specification, appended claims and accompanying drawings, wherein:

Fig. 1 is a perspective view of a coping wall showing the manner of positioning the expansion joint of the present invention between the coping units;

Fig. 2 is a side elevation, partly broken away in section, of the expansion joint and showing the same mounted on the coping wall; and, Fig. 3 is a vertical sectional view taken along line 3—3 of Fig. 2.

The expansion joint of the present invention comprises a base component of relatively rigid material which supports on either side thereof a body of yieldable compressible adhesive gasket material for forming the seal of the joint. Referring to the drawings, the base component is indicated at 10 and comprises a substantially rigid sheet or panel which is relatively thin and has a thickness considerably less than the width of the joint between the structural units, as illustrated in Fig. 3. The base sheet 10 may be formed of a mixture of cement and long asbestos fiber but any other material suitable for the purpose may be used. It is preferably cut to an outline similar to but slightly less than the cross sectional dimension of the structural units between which it is to be used. As shown in Figs. 1 and 2, one vertical side edge of the sheet may have a longer dimension than the opposite side edge to correspond with the sloping formation of the coping blocks.

The base sheet is preferably provided with a row of apertures or holes 12 along each side edge of the panel 10 and correlated to form a substantially rectangular outline of holes as illustrated in Fig. 2. Each row of holes is located adjacent to but slightly spaced from the nearest edge of the panel.

To allow for the expansion and contraction of the structural units between which the expansion gasket joint is placed, the base panel 10 is provided on each side with a body of compressible adhesive gasket material. Preferably, as shown in Fig. 2, the gasket material on each side of the panel extends in a continuous strip 14 overlying the row of holes which extends along each edge of the panel. Each separate straight line section of the strip 14 extends parallel to the adjacent edge of the panel and these are joined to one another at the corner areas of the panel. By virtue of this formation, the strip 14 extends completely around the panel and forms a seal adjacent to the four edges thereof. The plastic gasket material on one side of the panel is interlockingly joined to the gasket material on the other side of the panel by extending through the apertures 12 as indicated in Figs. 2 and 3. The adhesive characteristics of the gasket material normally holds the same on the panel 10 but the extension of this material through the apertures assures positive attachment of the material to the panel. The panel and gasket material form a unitary assembly capable of being easily handled and installed between the structural units as they are mounted in position.

An important feature of the invention is the provision of means on the expansion joint which serves as a guide for determining the desired space between the structural units and for limiting the extent that they may approach one another on opposite sides of the expansion joint. This means comprises projections or spacers carried by the panel which extend outwardly from the opposite sides thereof a distance substantially equal to that of the gasket material. These projections are preferably formed of short, separate spacer elements or members 18 composed of relatively rigid material as compared to the gasket material, such as cork, and are located at spaced points on the panel. These elements are initially shaped so as to extend equal distances from the sides of the panel as indicated in Fig. 3 and preferably at corresponding positions on opposite sides of the panel 10.

To facilitate manufacture and assembly of the parts of the expansion joint, the spacer elements 18 are embedded in the gasket material 14 and held thereby in bearing contact with the adjacent side of the panel 10. For this reason, the spacer elements 18 are located as shown in Fig. 2 in the gasket material between the outer and inner edges thereof and at the corners where the straight sections of the gasket material join with one another. To provide greater surface contact and to prevent turning of the spacer elements in the gasket material, they are preferably formed with a square or rectangular formation as shown in Fig. 2.

The holes or apertures 12 formed in the panel 10 are located along each side section of the gasket material. If the spacer elements are mounted in the corners of the gasket material, as shown in Fig. 2, the holes 12 are omitted from the corners so that the elements may bear fully on the adjacent side of the panel. If additional spacer elements are employed they may be located at points intermediate any adjacent pair of holes 12 along each side section of the gasket material.

The expansion joint is mounted between each pair of structural units as they are placed in position. Initially the outer faces of the gasket material 14 may be covered with a peelable film to prevent accidental adhesive contact with any exterior object. At the time the expansion joint is installed, the film is removed from the gasket material so as to expose its outer faces for contact with the side walls of the structural units. As shown in Fig. 1, a series of structural units such as copings 20, are laid successively on a wall 22. As each coping unit is positioned in place, an expansion gasket is laid up against the exposed end face of the structural unit and pressed thereagainst to adhesively engage its gasket material therewith. The next successive structural unit is then mounted on the wall 22 and shoved up against the exposed side of the expansion joint pressing its end face against the gasket material. If no means were provided for limiting the movement of one structural unit toward the other, it is possible that the workmen may bring the two units either too close or too far apart and form an undesirable joint. When the structural units are placed too close together, the gasket material is compressed and spread thin over the face of the panel and result in a joint providing less than the desired amount of room for expansion and contraction of the structural units.

The spacer elements 18 located on opposite sides of the panel 10 function to guide the workmen and save them the trouble of either guessing or measuring the space between each structural unit. These spacer elements have a dimension taken normal to the plane of said base panel which is no greater than the similar dimension of said gasket material. As a newly laid structural unit is forced into engagement with the exposed side of an expansion joint, such as that shown in Fig. 1, the spacer elements receive the positioning thrust of the unit and limit the distance that it can be forced toward the already laid structural unit. In this manner, it is not necessary that the workmen gauge the amount that the units must be placed apart to obtain the desired space for expansion and contraction. All it is necessary for the workman to do is to shove the structural block or unit against the exposed face of the expansion joint and when resistance to further movement is encountered he knows that the proper spacing of the units has been accomplished.

The spacer elements determine the initial spacing of the blocks and in addition ensure the presence between the structural blocks of sufficient adhesive compressible gasket material to serve its intended purpose.

What is claimed is:

1. An expansion joint for use between adjacent structural units comprising in combination a substantially rigid base panel, compressible bodies of adhesive gasket material secured to opposite surfaces of said panel, and spacer members of substantially the thickness of the gasket material embedded therein and held thereby in disconnected but bearing engagement with opposite surfaces of the base panel, said spacer members being compressible but relatively rigid in comparison with the gasket material.

2. An expansion joint for use between adjacent structural units comprising in combination a substantially rigid and apertured base panel, compressible adhesive gasket material secured to opposite surfaces of said panel and extending through the apertures to interlock the gasket material on one surface with that on the other, and spacer members of substantially the thickness of the gasket material embedded therein and held thereby in disconnected but bearing engagement with opposite surfaces of the base panel, said spacer members being compressible but relatively rigid in comparison with the gasket material.

3. An expansion joint for use between adjacent structural units comprising in combination a substantially rigid base panel, compressible bodies of adhesive gasket material secured to opposite surfaces of said panel, and spacer members embedded within the adhesive gasket material in spaced apart relation upon opposite sides of the base panel and held by said gasket material in disconnected relationship with the base panel, the dimension of said spacer members, taken normal to the plane of said base panel, being no greater than the similar dimension of said adhesive gasket material, said spacer members being compressible but relatively rigid in comparison with the adhesive gasket material.

4. An expansion gasket joint for use between adjacent structural units as defined in claim numbered 3 characterized in that the adhesive gasket material extends linearly about each opposite side surface of the panel along the margin thereof.

References Cited in the file of this patent

UNITED STATES PATENTS

| Number | Name | Date |
|---|---|---|
| 824,636 | Foans | June 26, 1906 |
| 860,927 | Mann | July 23, 1907 |
| 1,990,323 | Grund | Feb. 5, 1935 |
| 2,085,168 | Payne | June 29, 1937 |
| 2,290,424 | Grund | July 21, 1942 |
| 2,472,221 | Malthouse | June 7, 1949 |

FOREIGN PATENTS

| Number | Country | Date |
|---|---|---|
| 109,720 | Germany | Apr. 24, 1898 |